United States Patent
Pradhan et al.

(10) Patent No.: US 11,765,021 B2
(45) Date of Patent: Sep. 19, 2023

(54) CORRECTION OF NETWORK ERRORS USING ALGORITHMS

(71) Applicant: Rakuten Mobile, Inc., Tokyo (JP)

(72) Inventors: Vaibhav Pradhan, Tokyo (JP); Krishnan Venkataraghavan, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/457,977

(22) Filed: Dec. 7, 2021

(65) Prior Publication Data
US 2022/0286349 A1 Sep. 8, 2022

Related U.S. Application Data

(60) Provisional application No. 63/157,822, filed on Mar. 8, 2021.

(51) Int. Cl.
*H04L 41/069* (2022.01)
*H04W 36/30* (2009.01)
(Continued)

(52) U.S. Cl.
CPC ........ *H04L 41/069* (2013.01); *H04L 41/0631* (2013.01); *H04L 41/0636* (2013.01);
(Continued)

(58) Field of Classification Search
CPC ............. H04L 41/069; H04L 41/0636; H04L 41/0672; H04L 41/0896; H04W 76/18; H04W 36/305
See application file for complete search history.

(56) References Cited

U.S. PATENT DOCUMENTS

| | | | |
|---|---|---|---|
| 2008/0040299 A1* | 2/2008 | Faihe | G06F 11/2257 706/14 |
| 2009/0149180 A1 | 6/2009 | Kitazoe | |

(Continued)

FOREIGN PATENT DOCUMENTS

| | | | | |
|---|---|---|---|---|
| WO | WO-2013125900 A1 * | 8/2013 | ............ | H04W 24/08 |
| WO | WO-2015038230 A1 * | 3/2015 | ........ | H04W 36/0083 |

OTHER PUBLICATIONS

International Search Report dated Mar. 1, 2022 in International Application No. PCT/US2021/063035.
(Continued)

*Primary Examiner* — Glenton B Burgess
*Assistant Examiner* — Patrick F Ngankam
(74) *Attorney, Agent, or Firm* — Sughrue Mion, PLLC

(57) ABSTRACT

Proactively detecting one or more handover error in a communication link between base stations [14y, 14z] in a wireless communication network. A method may include determining at least one possible solution to the one or more handover error using an artificial intelligence engine 76. A method may include implementing the at least one possible solution to correct the one or more handover error. The artificial intelligence engine 76 may include an artificial intelligence algorithm, a machine learning algorithm, a deep learning algorithm, a neural network algorithm; and/or big data analysis algorithm. The artificial intelligence engine 76 may utilize at least one database [92, 94, 96] including a plurality of solutions. The plurality of solutions may include solutions to errors in communication networks that occurred in the past. The artificial intelligence engine 76 may successively implement each of the possible solutions until the one ore more handover error is corrected.

20 Claims, 18 Drawing Sheets

Figure 1:
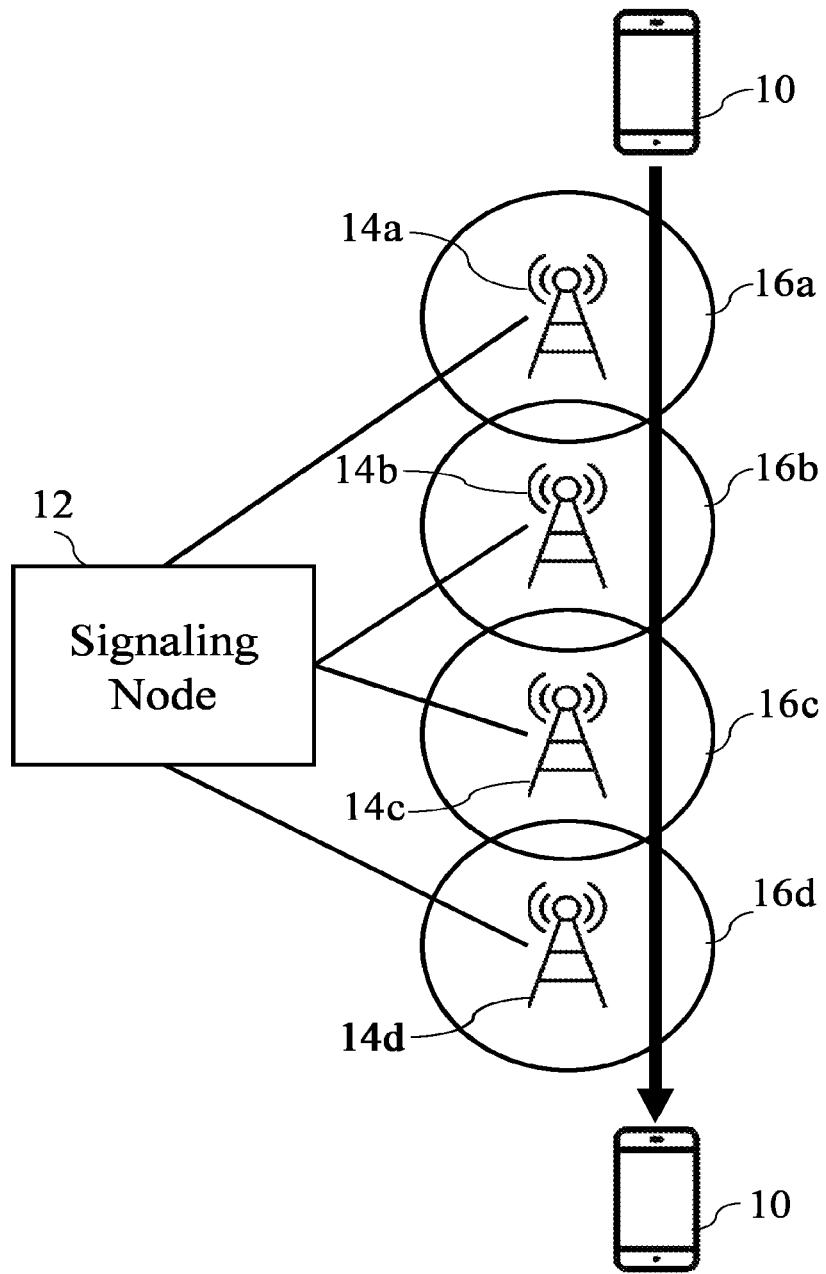

(51) Int. Cl.
*H04W 76/18* (2018.01)
*H04L 41/0896* (2022.01)
*H04L 41/0631* (2022.01)
*H04L 41/0659* (2022.01)

(52) U.S. Cl.
CPC ...... *H04L 41/0661* (2023.05); *H04L 41/0896* (2013.01); *H04W 36/30* (2013.01); *H04W 36/305* (2018.08); *H04W 76/18* (2018.02)

(56) References Cited

U.S. PATENT DOCUMENTS

| | | | | |
|---|---|---|---|---|
| 2010/0173633 | A1* | 7/2010 | Catovic | H04W 36/0094 455/436 |
| 2010/0178920 | A1* | 7/2010 | Kitazoe | H04W 36/0079 455/436 |
| 2012/0040662 | A1* | 2/2012 | Rahman | H04W 36/0022 455/423 |

OTHER PUBLICATIONS

Written Opinion of the International Searching Authority dated Mar. 1, 2022 in International Application No. PCT/US2021/063035.

\* cited by examiner

CORRECTION OF NETWORK ERRORS USING ALGORITHMS

BACKGROUND

Handovers are a sensitive operation in mobile communication networks. For example, in commercial mobile telephone networks, a relatively large number of users may each use their personal user equipment (e.g. cell phones, smart phones, connected cars, IOT devices, tablets, personal computers, etc.) and each user may expect a consistent connection to the wireless network as each user moves from cell to cell. In fact, in a properly operating wireless network, a user should not have any idea when there is a handover from one cell to another cell. In other words, there is a strong expectation that handovers are seamless. In these commercial networks, for commercial success it is paramount that dropped calls or intermittent data services are a rare occurrence. Commercial networks are just one example, as other industrial and government networks also have handover requirements, as breaks in communication service in non-commercial networks can have disastrous consequences (e.g. failure of government services, factory accidents, etc.).

SUMMARY

Embodiments relate to a method. The method may include proactively detecting at least one handover error in a communication link between base stations in a wireless communication network. The method may include determining at least one possible solution to the at least one handover error using an artificial intelligence engine. The method may include implementing the at least one possible solution to correct the at least one handover error.

In embodiments, the at least one possible solution includes a plurality of possible solutions. The implementing the at least one possible solution may include implementing a first possible solution of the plurality of possible solutions to correct the at least one handover error. If the implementing the first possible solution of the plurality of possible solutions fails to correct the at least one handover error, then implementing a second possible solution of the plurality of possible solutions to correct the at least one handover error. The method comprises updating the artificial intelligence engine based on the results of the implementing the first possible solution and implementing the second possible solution.

In embodiments, the artificial intelligence engine may implement at least one of an artificial intelligence algorithm, a machine learning algorithm, a deep learning algorithm, a neural network algorithm, and/or a big data analysis algorithm.

In embodiments, the artificial intelligence engine may utilize at least one database comprising a plurality of solutions.

In embodiments, the plurality of solutions includes solutions to handover errors in communication networks that occurred in the past.

In embodiments, the at least one database comprises at least one of a database of base stations in the communication network, a database of cells in the communication network, a database of network relation table relations in the communication network, a database of network relation table issues in the communication network, a database of handover relation issues in the communication network; and/or a database of X2 relation issues relations in the communication network.

In embodiments, the artificial intelligence engine identifies the at least one possible solution based on similarity to the handover errors in wireless communication networks that occurred in the past. In embodiments, the artificial intelligence engine successively implements each of the at least one possible solution until the at least one handover error is corrected.

In embodiments, the handover error is a failure to handover a communication link between user equipment from a first communication node to a second communication node.

In embodiments, the wireless communication network is an LTE, 4G, and/or 5G network. In embodiments, at least one of the first communication node and/or the second communication node is an LTE, 4G, and/or 5G base station. In embodiments, the handover error is an X2 interface error.

In embodiments, the first communication node and the second communication node are different types of communication nodes.

In embodiments, the different types of communication nodes are from different manufacturers. In embodiments, the different types of communication nodes are at least two of macro cells, small cells, outdoor cells, indoor cells, femto cells, and/or micro cells. In embodiments, the different types of communication nodes are on different local networks.

In embodiments, the handover error is at least one of an X2 interface error, a one-way communication error, an incomplete connection error, and/or an S1 handover communication error.

In embodiments, the handover error is a neighbor relation table error. In embodiments, the neighbor relation table error includes at least one of missing values, incomplete definitions, one-way communication configurations; and/or one-way X2 relations.

In embodiments, if the artificial intelligence engine is unable to determine the at least one possible solution to the handover error, then the error is referred to a human resource to determine the at least one possible solution.

In embodiments, the at least one possible solution determined by the human resource is added to the artificial intelligence engine for future implementation of the determining the at least one possible solution to the handover error.

In embodiments, if the artificial intelligence engine is unable to successfully implement the at least one possible solution to correct the handover error, then the error is referred to a human resource to determine the at least one possible solution.

In embodiments, the at least one possible solution determined by the human resource is added to the artificial intelligence engine for future implementation of the implementing the at least one possible solution.

In embodiments, the method is performed in a cloud computing system.

Embodiments relate to an apparatus. In embodiments, the apparatus includes a detection unit configured to proactively detect at least one handover error in a communication link between base stations in a wireless communication network. In embodiments, the apparatus includes a determination unit configured to determine at least one possible solution to the at least one handover error using a artificial intelligence engine. In embodiments, the apparatus includes an implementation unit configured to implement the at least one possible solution to correct the at least one handover error.

Embodiments relate to a computer program product. The computer program product may include a computer readable hardware storage device having computer readable program code stored therein. The program code may contain instructions executable by one or more processors of a computer system to implement a method. The method may include proactively detecting at least one handover error in a communication link between base stations in a wireless communication network. The method may include determining at least one possible solution to the at least one handover error using an artificial intelligence engine. The method may include implementing the at least one possible solution to correct the at least one handover error.

DRAWINGS

Example FIG. 1 illustrates a handover of user equipment in wireless cells, in accordance with embodiments.

Figure 2:
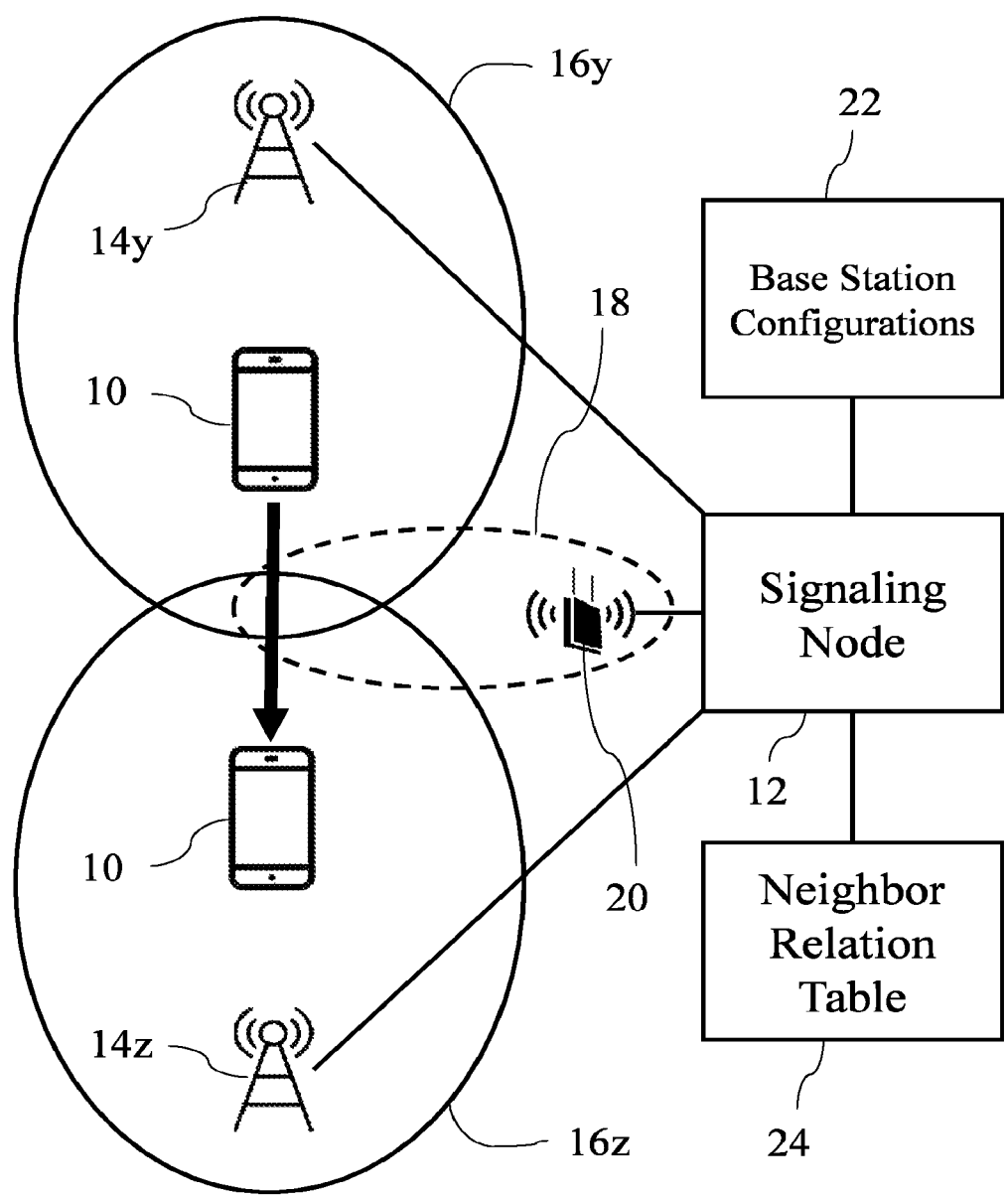

Example FIG. 2 illustrates a signaling node functionality in a wireless network, in accordance with embodiments.

Figure 3:
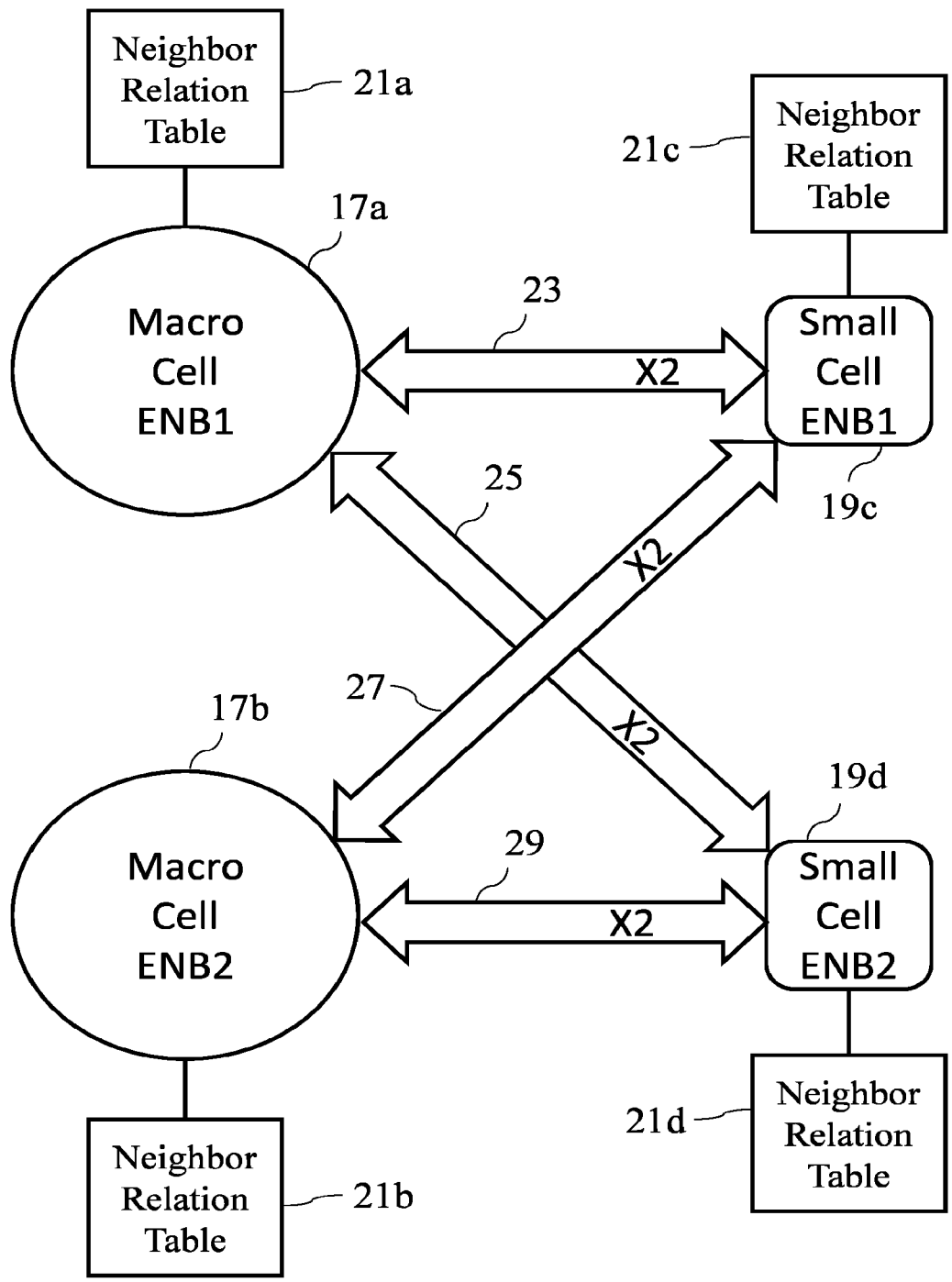

Example FIG. 3 illustrates X2 relationships between neighboring wireless cells of an LTE, 4G, and/or 5G wireless communication system, in accordance with embodiments.

Figure 4:
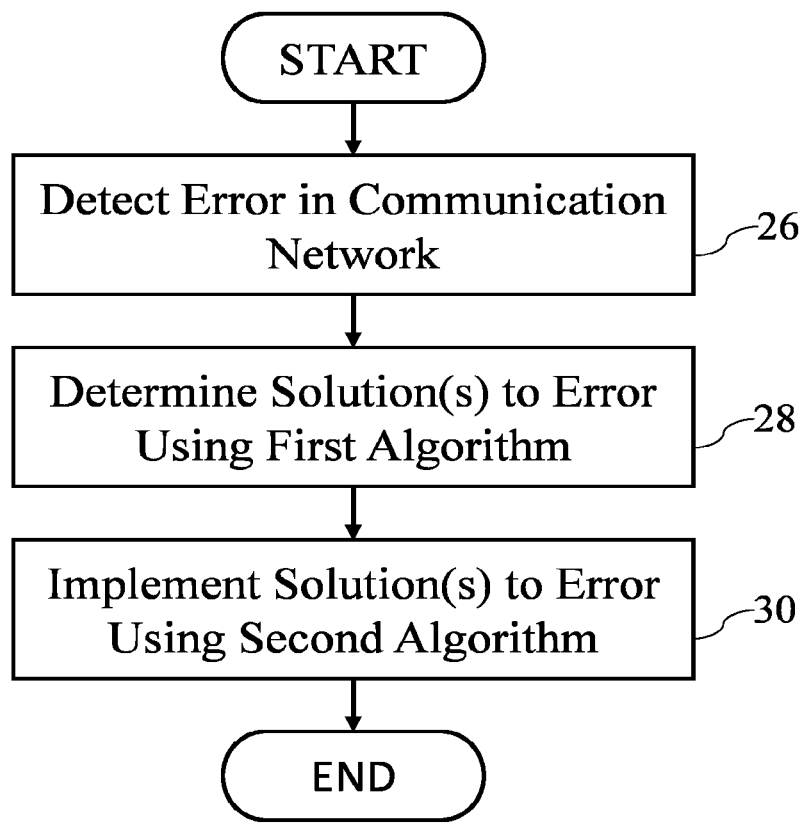

Example FIG. 4 illustrates a process of proactively correcting errors in a communication network, in accordance with embodiments.

Figure 5:
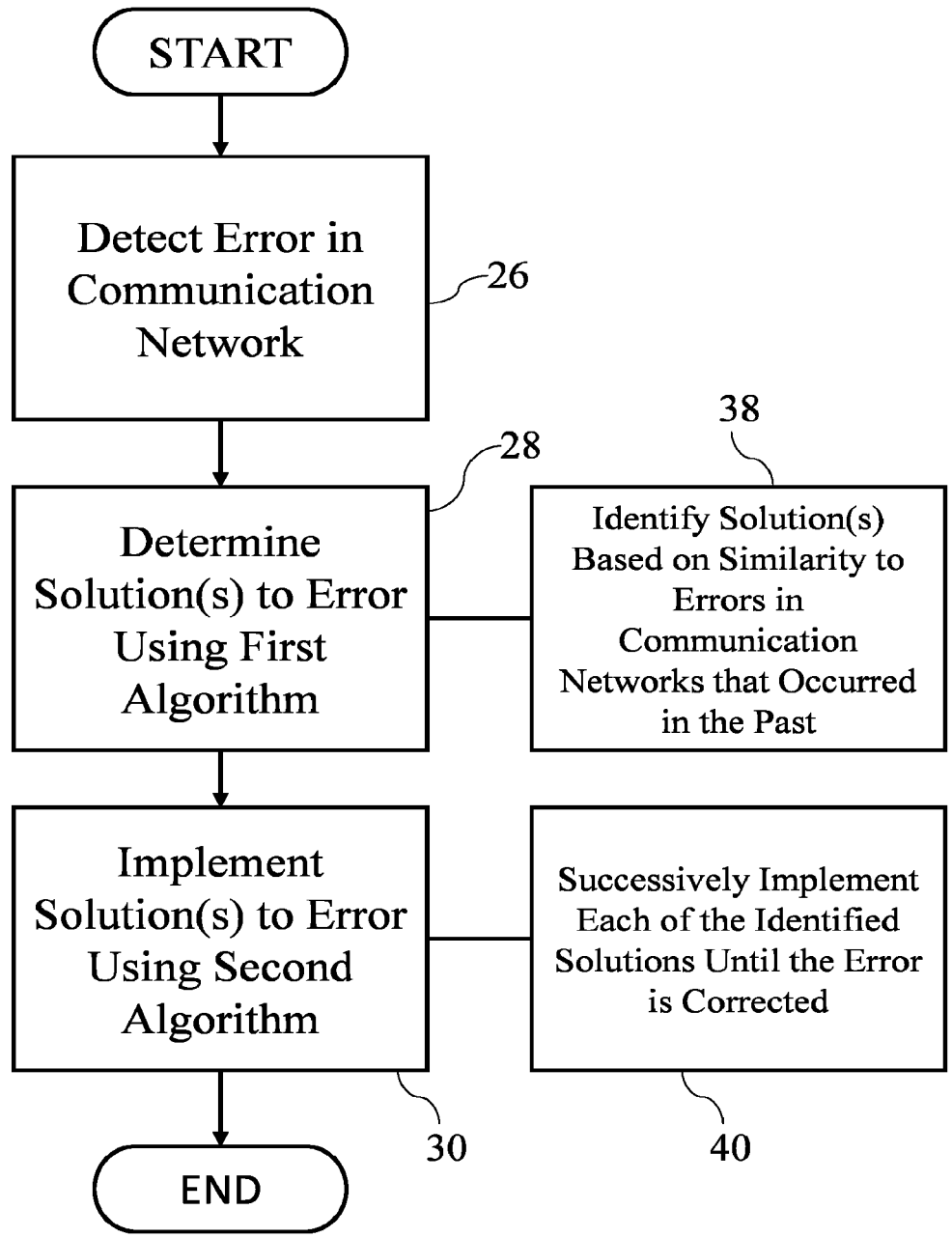

Example FIG. 5 illustrates a process using algorithms to correct errors in a communication network, in accordance with embodiments.

Figure 6:
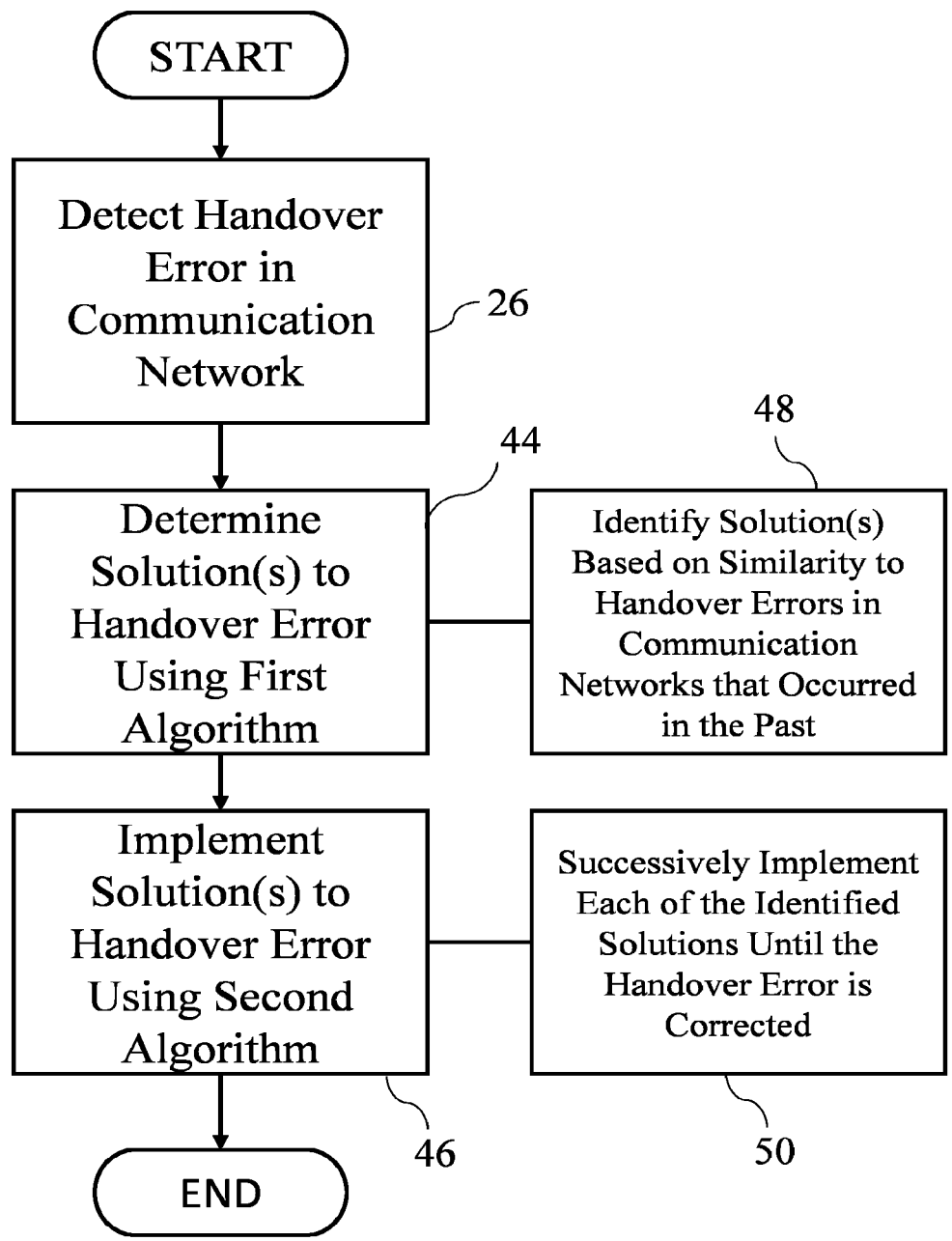

Example FIG. 6 illustrates a process using algorithms to correct handover errors in a communication network, in accordance with embodiments.

Figure 7A:
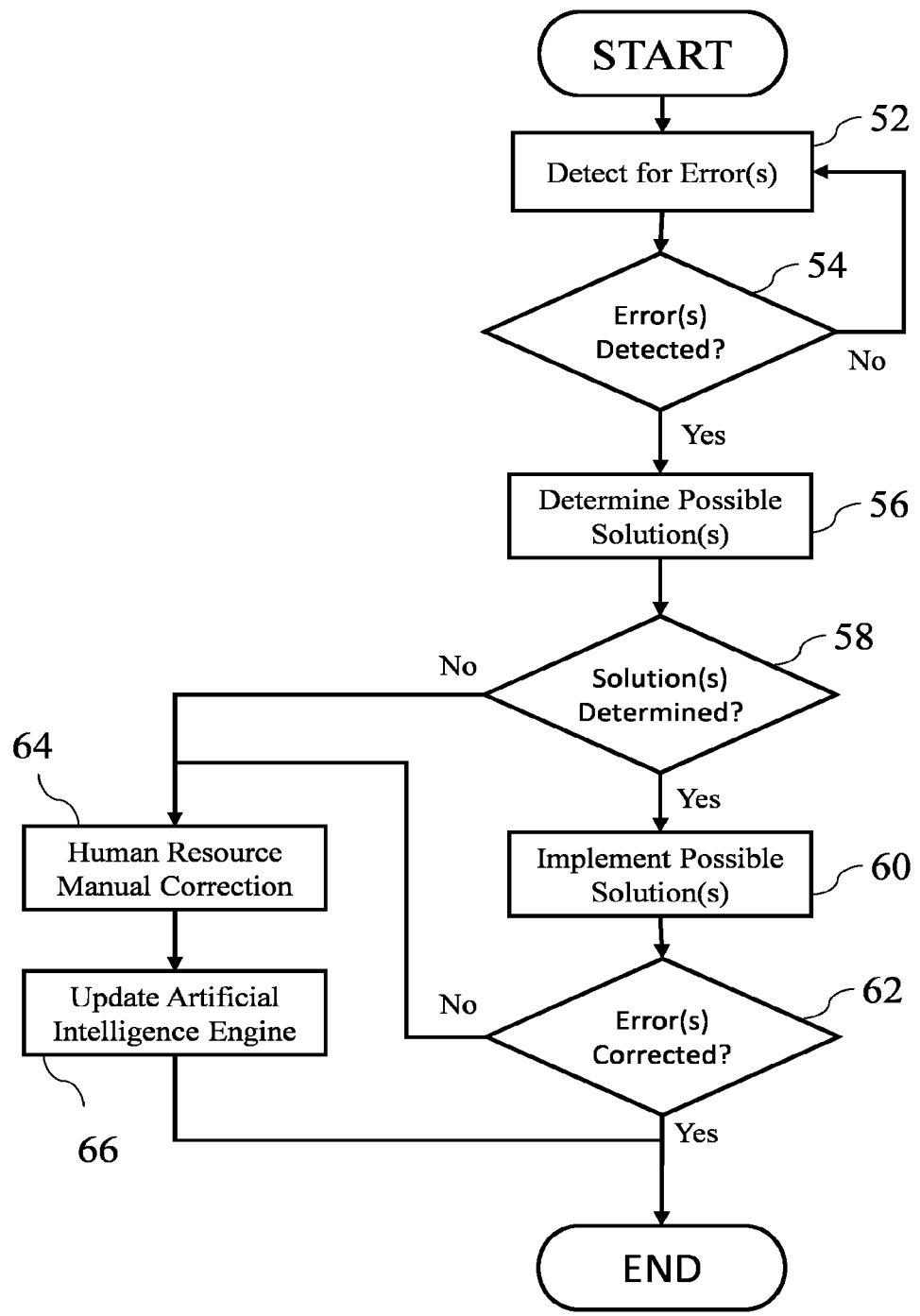
Figure 7B:
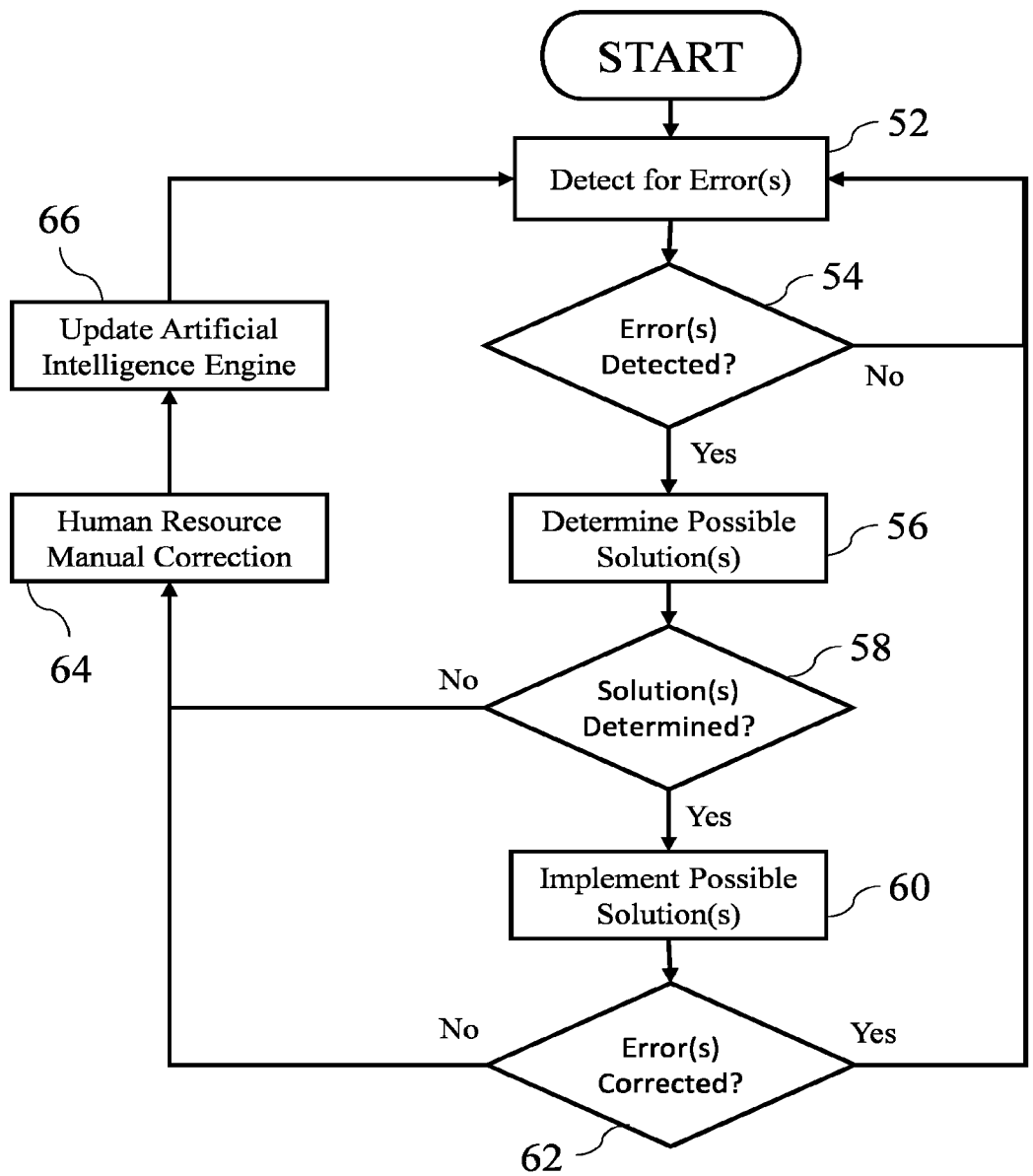
Figure 7C:
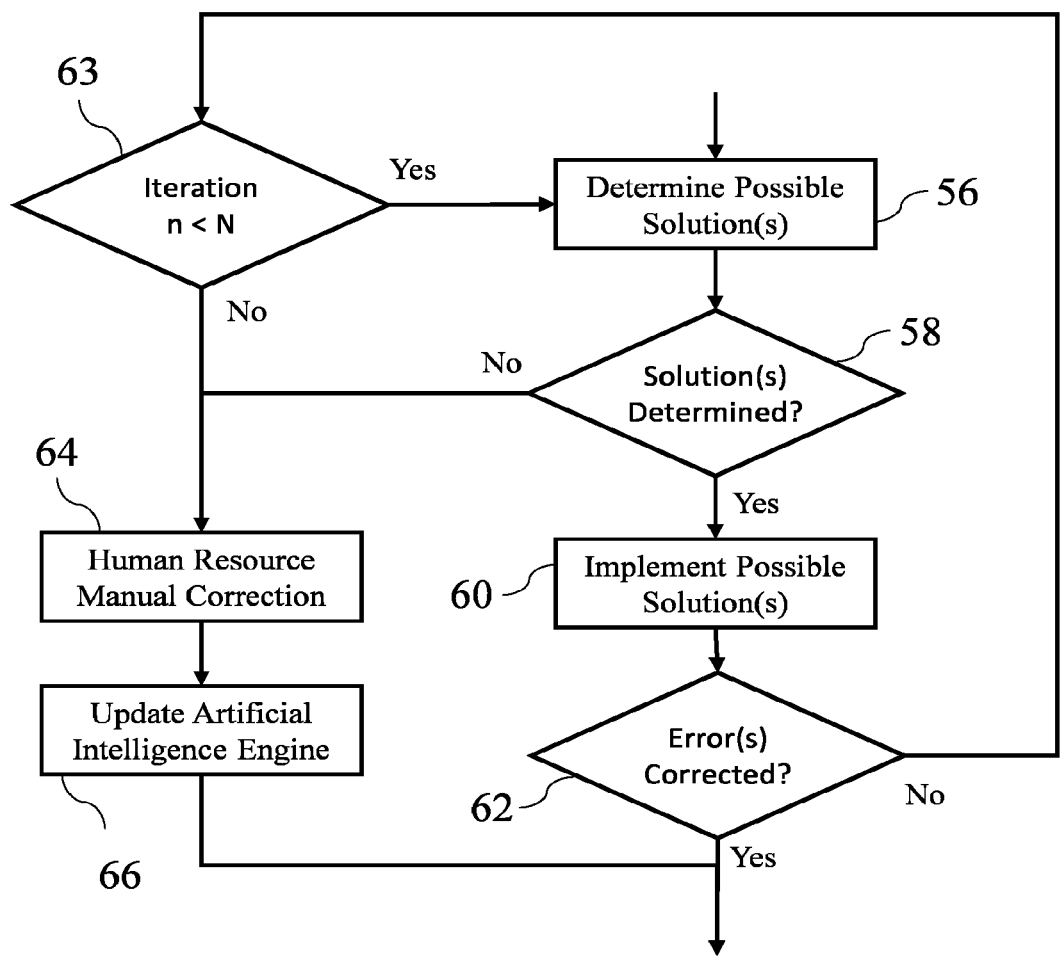

Example FIGS. 7A, 7B and 7C illustrate processes of updating an artificial intelligence engine with feedback from human resources, in accordance with embodiments.

Figure 8:
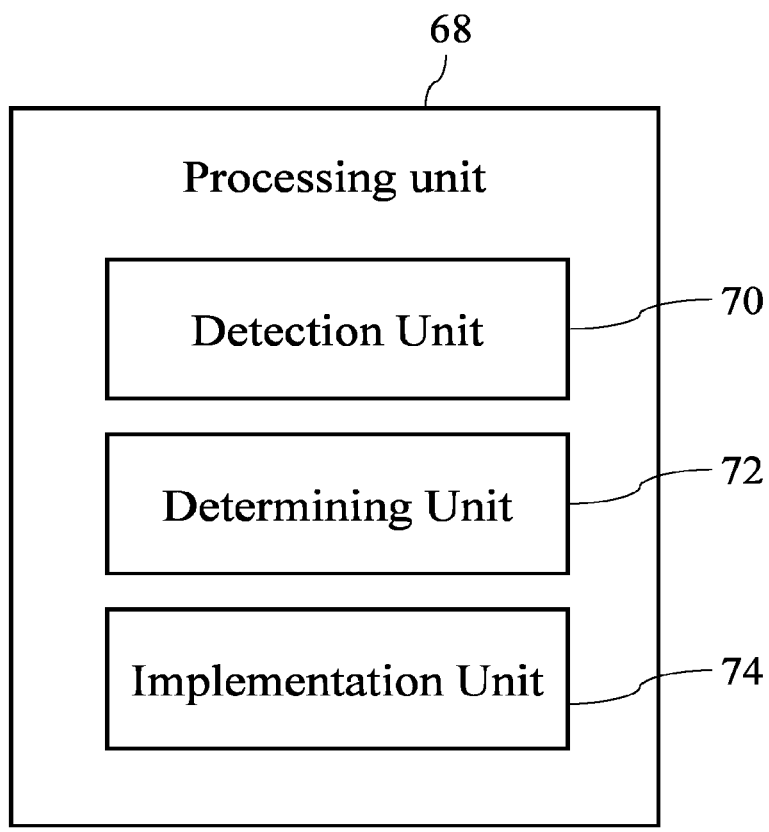

Example FIG. 8 illustrates a processing unit, in accordance with embodiments.

Figure 9:
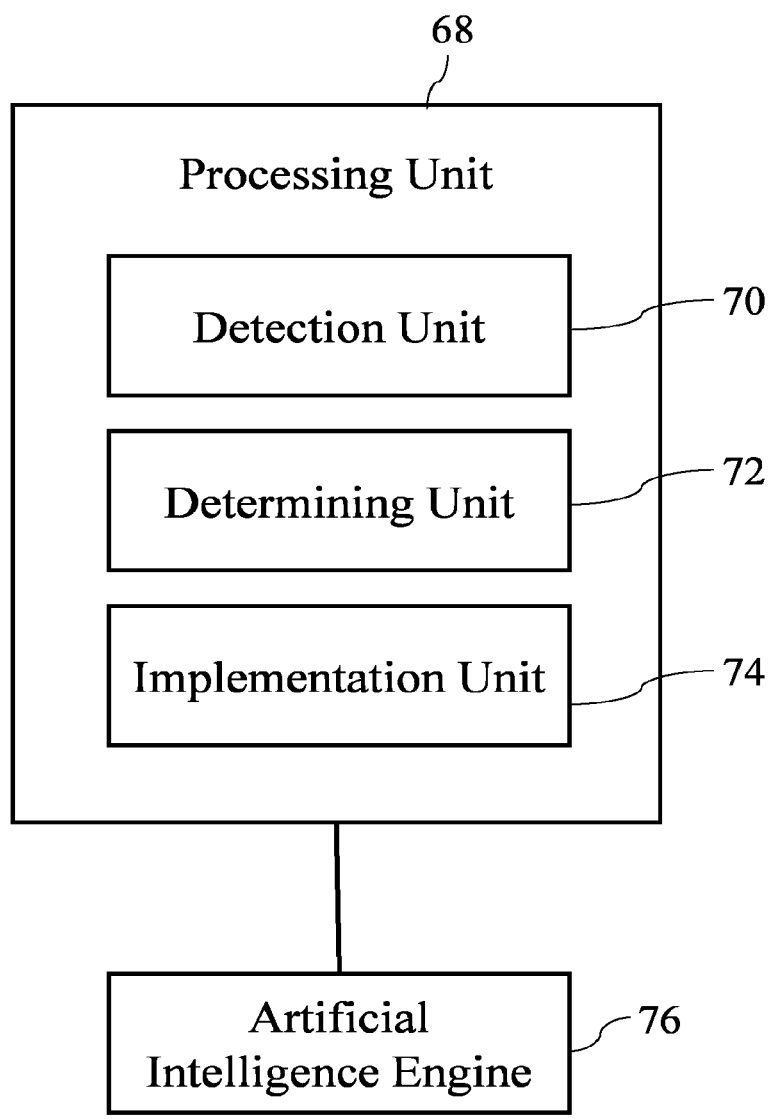

Example FIG. 9 illustrates a relationship between a processing unit and an artificial intelligence engine, in accordance with embodiments.

Figure 10:
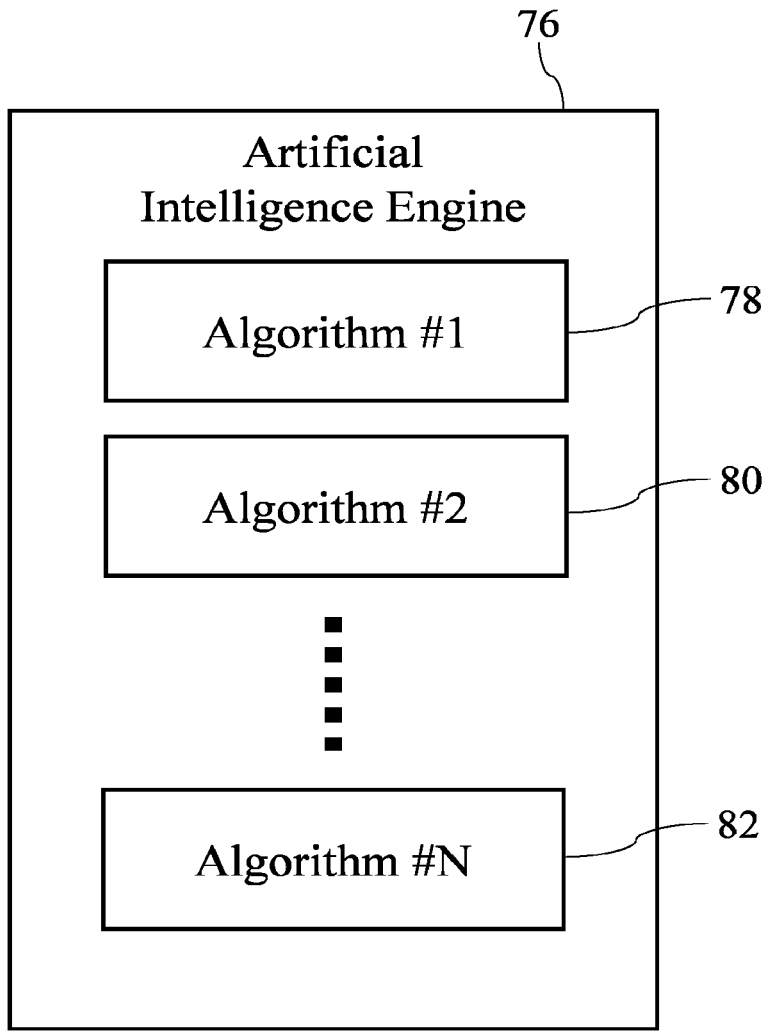

Example FIG. 10 illustrates multiple algorithms included in an artificial intelligence engine, in accordance with embodiments.

Figure 11:
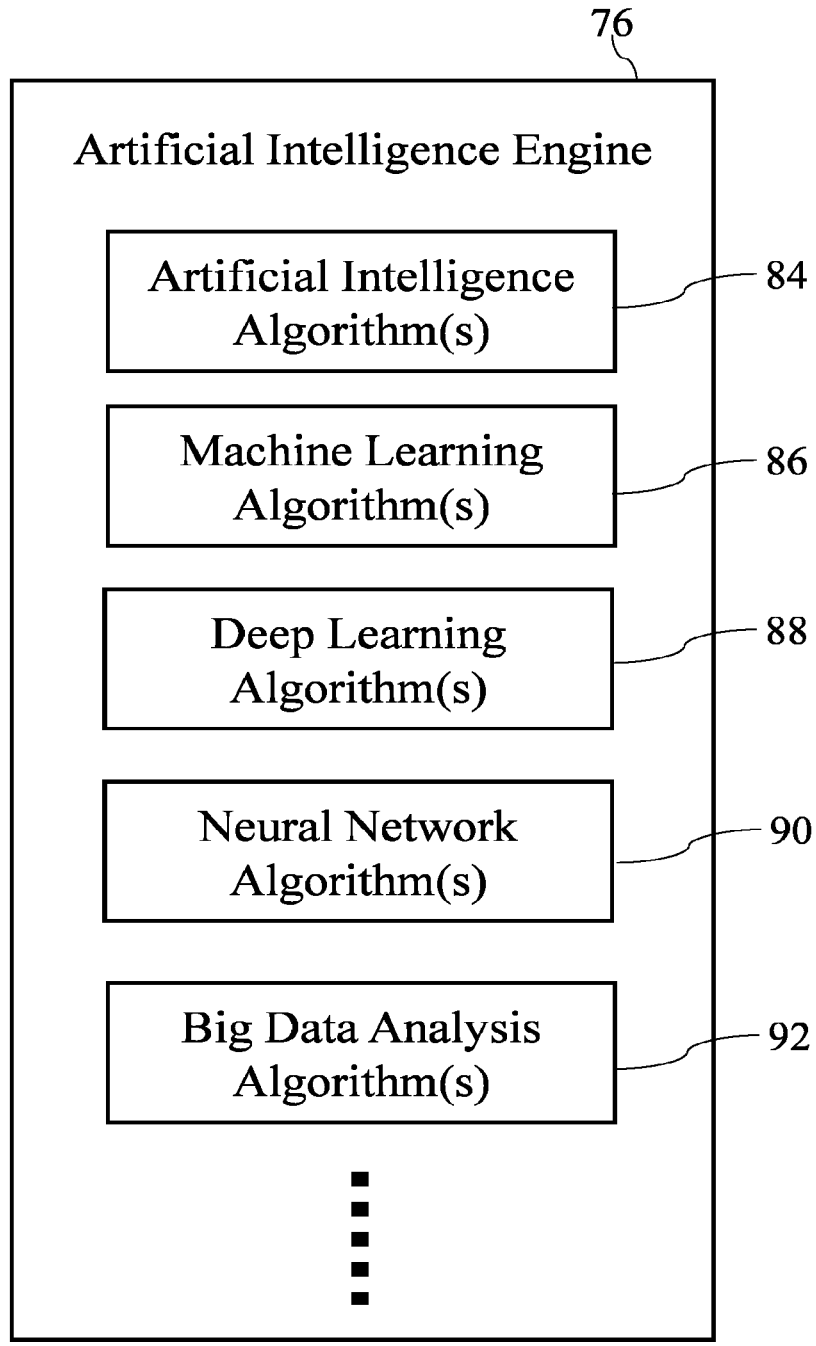

Example FIG. 11 illustrates different types of artificial intelligence algorithms that may be included in an artificial intelligence engine, in accordance with embodiments.

Figure 12:
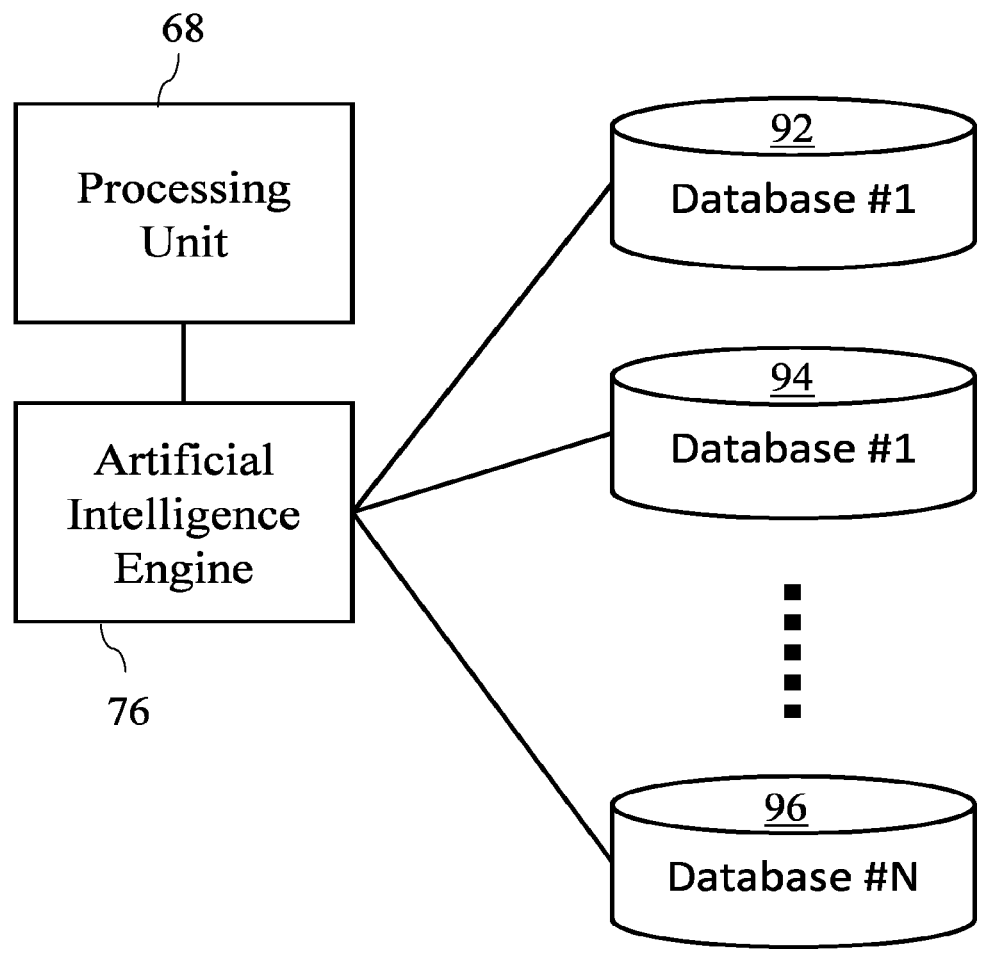

Example FIG. 12 illustrates an artificial intelligence engine interfacing with a plurality of databases, in accordance with embodiments.

Figure 13:
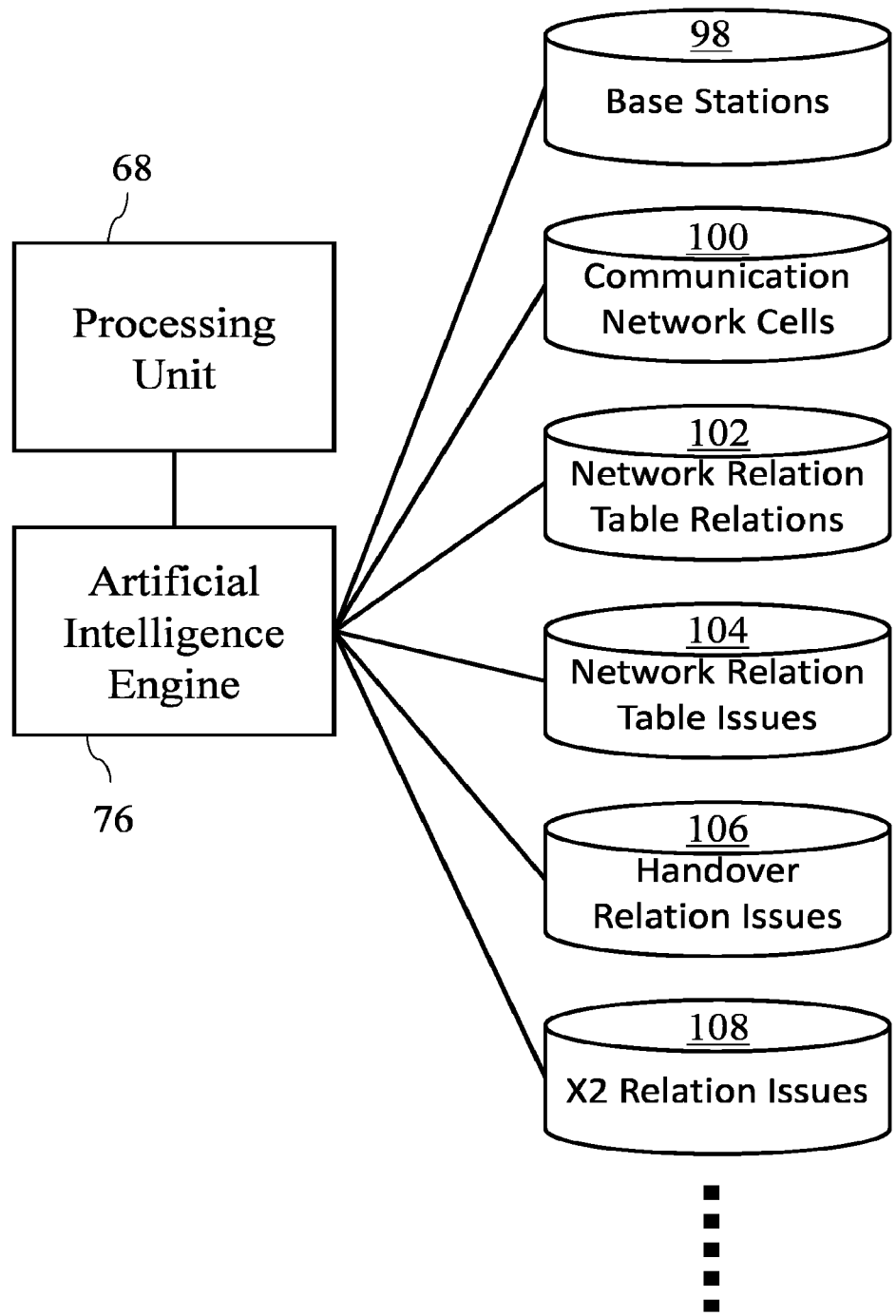

Example FIG. 13 illustrates the different types of databases with which an artificial intelligence engine may interface, in accordance with embodiments.

Figure 14:
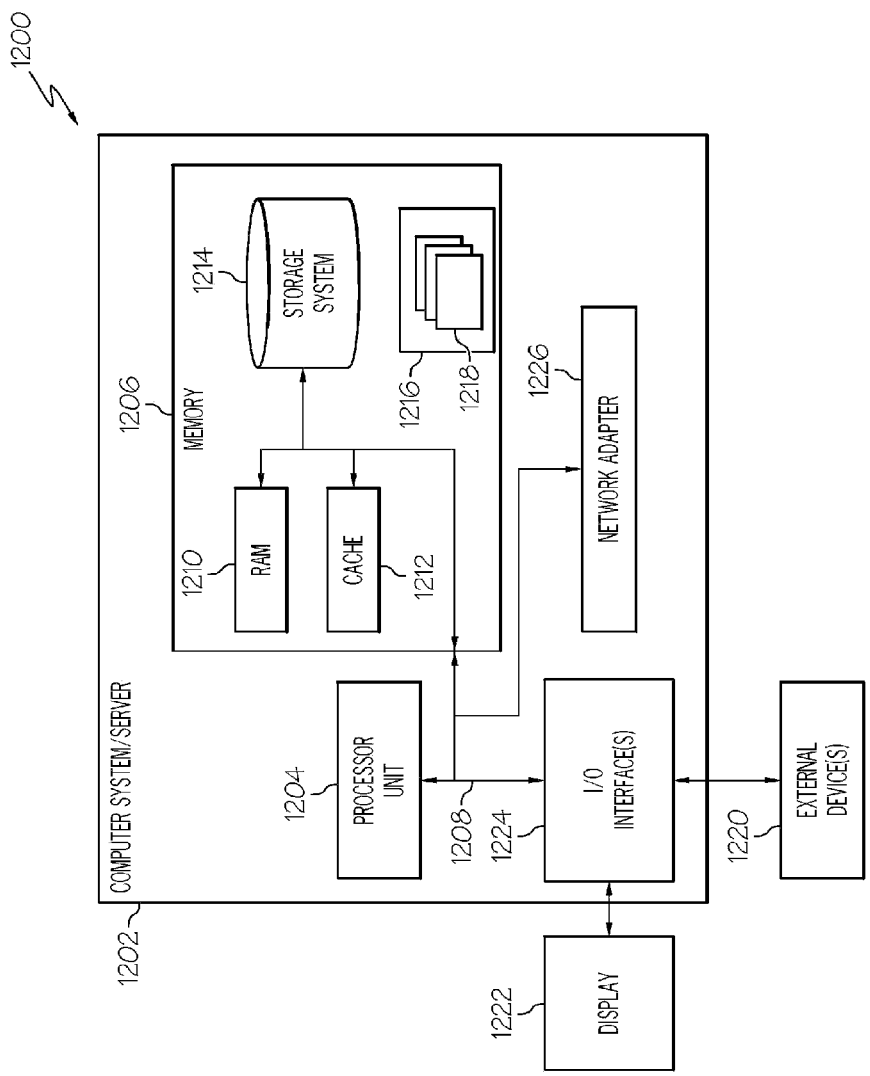

Example FIG. 14 illustrates a cloud computing node, in accordance with embodiments.

Figure 15:
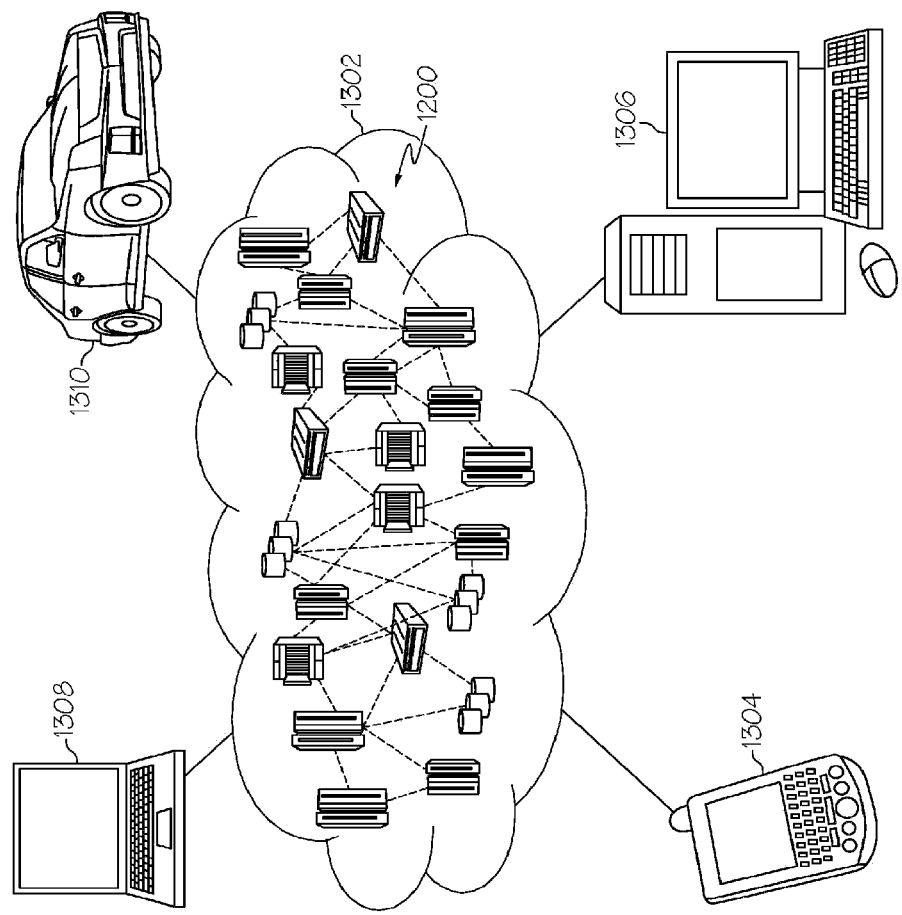

Example FIG. 15 illustrates a cloud computing environment, in accordance with embodiments.

Figure 16:
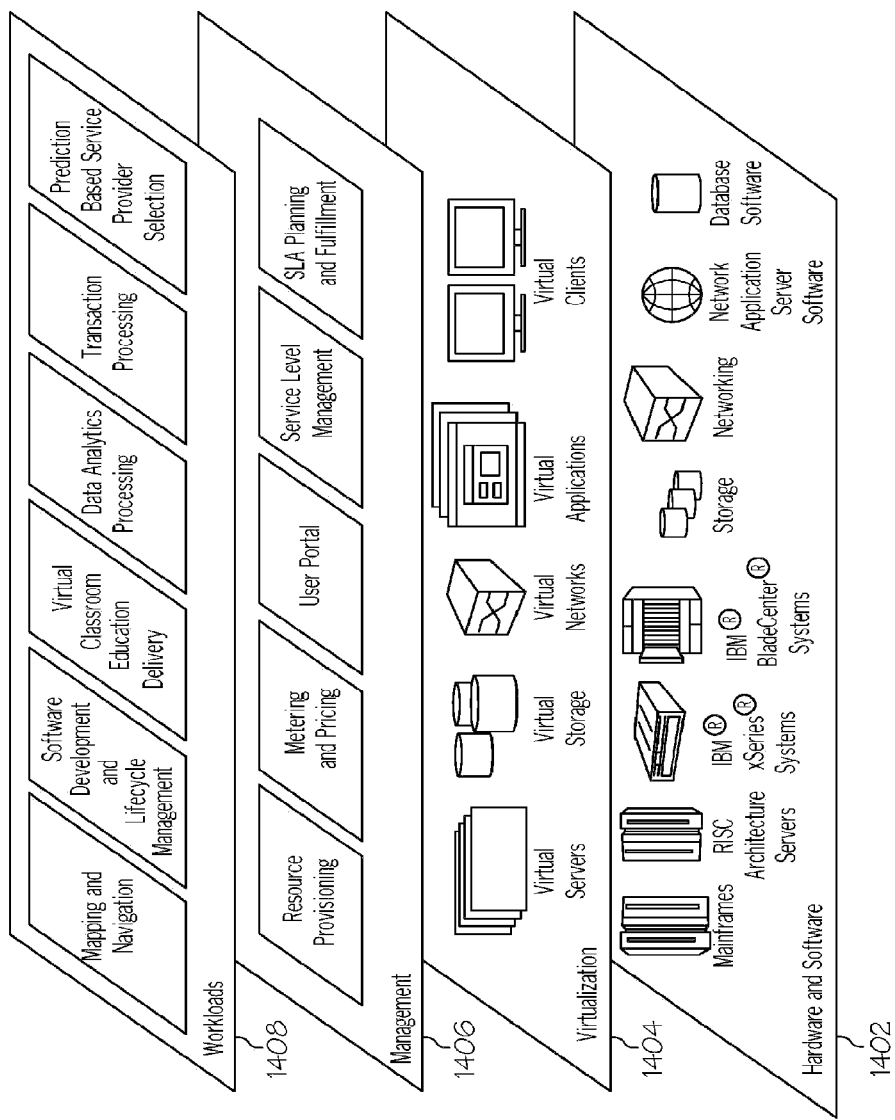

Example FIG. 16 illustrates abstraction model layers, in accordance with embodiments.

DESCRIPTION

Example FIG. 1 illustrates handover of user equipment in wireless cells, in accordance with embodiments. In some wireless communication systems, user equipment 10 (e.g. mobile phones, tablets, IOT devices, etc.) may wirelessly communicate with a base station 14a. For example, base station 14a may be connected to a communication network, such that when user equipment 10 communicates with base station 14a, the base station 14a is able to provide voice and/or data services to the user equipment 10 through a wireless connection. Since base station 14a is essentially an antenna, base station 14a has a wireless range, which forms a cell 16a. Under normal operation, when user equipment 10 is located within cell 16a, user equipment 10 is able to communicate with base station 14a. Generally, when user equipment 10 is outside cell 16a, user equipment 10 may not be able to efficiently, practically, or communicate at all with base station 14a. Base station 14b may only provide wireless communication for connectivity to user equipment 10, while also being connected to a backbone communication network by wired connection. However, in some configurations, base station 14b may be connected to a backbone communication network by a wireless connection.

By the nature of mobile wireless communications, user equipment 10 may move between multiple cells (e.g. cells 16a, 16b, 16c, 16d, etc.) of multiple base stations (e.g. base stations 14a, 14b, 14c, 14d, etc.). As user equipment 10 moves from one cell (e.g. cell 16a) to another cell (e.g. cell 16b), a handover operation occurs. Handover operations may be managed by a signaling node 12, which coordinates the handovers between the base stations (e.g. base stations 14a, 14b, 14c, 14d, etc.). In general, during a handover operation, a communication network passes the wireless connection of user equipment 10 from one base station (e.g. base station 14a) to another base station (e.g. base station 14b) in a manner that does not interrupt or minimizes interruption of voice and/or data services to the user equipment 10. Mobile communication networks may have multiple base stations (e.g. base stations 14a, 14b, 14c, 14d, etc.) that are arranged such that there is overlap between the associated cells (e.g. cells 16a, 16b, 16c, 16d, etc.) and the network of cells covers a geographic range in which user equipment 10 can travel without services being interrupted.

Over time, mobile communication networks have developed, such that user equipment 10 may have increasingly faster data connections with base stations (e.g. base stations 14a, 14b, 14c, 14d, etc.), which is of great benefit to consumers. For example, 4G and LTE mobile networks have been able to provide impressive data rates, which has fueled widespread adoptions of smart phones which are able to stream live video data over commercial wireless networks. 5G telecommunication networks have provided another leap in mobile data rates, which has fueled mobile applications such as autonomous vehicles and other spectacular applications. Networks beyond 5G are being developed and each generation of mobile network will have improved data rates.

In general, as mobile networks have evolved and the data rates have increased, the number of cells in the network has also increased. In many circumstances, the size of the cells have gotten smaller. Accordingly, as the number of cells has increased, the number of handovers that occur when users move from one location to another location has also increased. It can be expected that errors will routinely occur in handover operations, which are relatively sensitive operations. As the number of base stations in a network are very large, it may be impractical for human resources to be able to effectively fix these errors. Accordingly, embodiments relate to proactively correcting handover errors using algorithms without the necessity of human resources to correct every error. These errors may occur for several reasons.

For example, two neighboring base stations may not be configured correctly and therefore are unable to perform a handover operation. Specifically, in LTE, 4G, and/or 5G networks, two neighboring base stations may fail to have an X2 configuration that allows handovers. In some circumstances, two neighboring base stations are from different manufacturers, different models, different software versions, on different networks, and/or any other reason appreciated by those skilled in the art. Once these configuration errors are detected by a human resource, the human resource can trouble shoot to reconfigure the base stations so that they operate correctly. However, the use of human resources may be impractical on a large network without the use of algorithms.

As another example, a signaling node 12 may not be aware that two base stations are adjacent to each other and capable of handover operations. A signaling node 12 may have neighbor relation tables, which map out the spatial relationships between base stations which are guide the signaling node 12 during handover management. However, if the entries in these neighbor relation tables are incorrect, then handover operations may fail. These errors in the neighbor relation tables may be detected by a human resource, the human resource can then manually correct the neighbor relation table so that handovers can be correctly performed. However, the use of human resources may be impractical on a large network without the use of algorithms.

Example FIG. 2 illustrates a signaling node functionality in a wireless network, in accordance with embodiments. In this example, user equipment 10 is originally in cell 16y serviced by base station 14y. User equipment 10 may move (e.g. based on the user's movement) from cell 16y to cell 16z serviced by base station 14z. When this transition occurs, signaling node 12 will perform a handover operation such that the user equipment 10 will stop using base station 14y as the primary wireless communication portal and start to use base station 14z as the primary wireless communication portal. As shown in FIG. 2, there is overlap between cell 16y and 16z, so the handover may be processed without any interruption in service to user equipment 10.

Signaling node 12 is a software operation and/or processing entity operated during management of the wireless network. For example, in LTE and/or 5G systems, signaling node 12 may be a mobility management entity (MME). In embodiments, signaling entity 12 may be operated in a cloud computing environment. In embodiments, signaling entity 12 may be operated at a central office, locally at a base station, and/or in any other configuration and/or location appreciated by those skilled in the art. Signaling entity 12 may utilize base station configurations 22 and/or neighbor relation table 24 to perform handover operations. As appreciated by those skilled in the art, signaling entity 12 may utilize any number of other resources beside base station configurations 22 and/or neighbor relation table 24 to facilitate handover operations. Base station configurations 22 and/or neighbor relation table 24 may be co-located with signaling entity 12 or remotely located, as appreciated by those skilled in the art.

In some circumstances, base station 14y may be manufactured by a different vendor than base station 14z, which may cause configuration problems. Although base station 14y and base station 14z are manufactured by different manufacturers, they may be designed to be interoperable on a mobile network. However, because there are some differences between manufacturers, base stations of different manufacturers may need to be specifically configured to ensure that they can perform a handover operation. These configurations may be accessible by signaling entity 12 by a base station configuration 22 resource. Although such corrections may be made by a human resource, in many circumstances using a human resource may be impractical based on the size of the network and variation of experience between different human resources.

Likewise, base station 14y and base station 14z may be manufactured by the same manufacturer, but are different models, which may cause configurations errors, which need to be corrected. Similarly, base station 14y and base station 14z may be the same manufacturer and model, but operating different software and/or firmware versions, which may cause configuration errors, which need to be corrected. Those of ordinary skill in the art appreciate that there are many different reasons why configuration errors may occur, which prevents handover operations from occurring. Human resources may be inadequate for such reconfigurations, without the use of algorithms.

In embodiments, there are many different types of base stations in a wireless network. For example, base station 14y and base station 14z may be outdoor base stations with relatively large cells. However, within a wireless network, there may exist base station 20, which is an indoor base station with smaller cell 18. There may be overlap between cell 16y, cell 16z, and cell 18. Further the range and parameters of cell 16y, cell 16z, and cell 18 may frequently change due to electromagnetic interference, repositioning of antennas, power supply issues, additions of base stations, subtraction of base stations, and/or any number of reasons appreciated by those skilled in the art. Such changes may have an effect on the neighbor relation table 24, as the intersections of neighboring cells may change. Likewise, if intersections of neighboring cells change, base station configurations 22 may also need to be changed for new intersections, multiple overlaps of base stations, and/or other reasons appreciated by those skilled in the art. Human resources may be inadequate to reprogram base station configurations 22 and/or neighbor relation table 24, without the use of algorithms.

Example FIG. 3 illustrates X2 relationships between neighboring wireless cells of an LTE, 4G, and/or 5G wireless communication system, in accordance with embodiments. In LTE, 4G, and/or 5G wireless systems handovers between neighboring and/or overlapping cells may be managed by X2 protocols. As an illustrative example, a portion of a wireless communication network may include macro cell ENB2 17a, macro cell ENB2 17b, small cell ENB1 19c, and/or small cell ENB2 19d. Macro cell ENB1 17a may have X2 relationship 23 with small cell ENB1 19c. In this example, the X2 relationship 23 between macro cell ENB1 17a and small cell ENB1 19c may be broken for a variety of reasons. If the X2 relationship 23 is broken, then a handover between macro cell 17a and 19c will fail, which is an undesirable circumstance. As one example, X2 relationship 23 may be broken because the neighbor relation table 21a associated with macro cell ENB1 17a may have incorrect or out-of-date entries. However, there are other reasons aside from neighbor relation tables why X2 relationships may be broken, as appreciated by those skilled in the art.

Similar to macro cell ENB1 17a being associated with neighbor relation table 21a, small cell ENB1 19c may be associated with neighbor relation table 21, macro cell ENB2 17b may be associated with neighbor relation table 21b, and/or small cell ENB2 19d may be associated with neighbor relation table 21d. Macro cell ENB1 17a may have X2 relationship 25 with small cell ENB2 19d, macro cell ENB2 17b may have X2 relationship 27 with small cell ENB1 19c and X2 relationship 29 with small cell ENB2 19d.

X2 protocols may include mobility management, load management, reporting of general error situations, setting/re-setting X2 relationships, base station configuration updates, and/or other functionality appreciated by those skilled in the art, in accordance with embodiments. Mobility management aspects of X2 protocols may include enabling a serving base station to move user equipment responsibility to a target base station. Load management aspects of X2 protocols may include implementing procedures to report resource status, overload indication, current traffic loading between base stations, and/or other reportable circumstances. Reporting of general error situation aspects of X2 protocols may implement procedures to report general error situations at base stations. Setting/re-setting X2 relationship may enable procedures to setup and/or reset X2 interfaces by exchanging necessary information between base stations. Base station configuration update aspects of X2 protocols may implement procedures to update application level data required for the base stations to interoperate in the wireless network.

Example FIG. 4 illustrates a process of proactively correcting errors in a communication network, in accordance with embodiments. In embodiments, after the start of a process, in step 26, an error may be detected in a communication network. For example, in embodiments illustrated in example FIGS. 8 and/or 9 a detection unit 70 may detect an error in a communication network. After an error is detected, in step 28, a first algorithm may be performed to determine solutions to the detected error, in accordance with embodiments. For example, in embodiments illustrated in example FIGS. 8 and/or 9, a determining unit 72 may determine solutions to a detected error. In step 30, after the first algorithm determines solutions, then those solutions may be implemented, in accordance with embodiments. For example, in embodiments illustrated in FIGS. 8 and/or 9, an implementation unit 74 may implement determined solutions. In embodiments, steps 26, 28, and 30 may be performed automatically without the use of human resources.

In step 26, errors in a communication network may be detected proactively, in accordance with embodiments. Although some embodiments relate to handover errors, embodiments are not limited to handover errors. Errors in a communication network may be detected based on an analysis of the communication network that examines the correctness of base station configurations of adjacent cells. For example, this analysis may be performed by simulations that anticipate the operation of a network, analysis bots, and/or other mechanisms appreciated by those skilled in the art. In embodiments, an error may be detected proactively without the necessity of a network failure to occur first. In some embodiments, an error may be detected as a result of a network failure.

In step 28, a first algorithm may determine a solution to the detected error, in accordance with embodiments. In embodiments, the first algorithm may be in many different forms. In embodiments, the error in the communication network may be any kind of error and not limited to handover errors. In embodiments, a plurality of possible solutions may be determined in step 28 which may possibly correct the error.

In step 30, a second algorithm may implement a solution determined in step 28, in accordance with embodiments. In embodiments, the second algorithm may be in many different forms. In embodiments, the implementation of the solution may be the implementation of the plurality of solutions determined in step 28, in succession, until the error is corrected.

Example FIG. 5 illustrates a process using algorithms to correct errors in a communication network, in accordance with embodiments. In embodiments, in step 28, determining solutions to errors using the first algorithm may identify solutions based on similarity to errors in communication networks that occurred in the past, as shown in block 38. Although there may be many different manufacturers, models, software, or other configurations of base stations in a mobile communication network, there is some chance that use of the same components has been used on the past and solutions to such problems have been determined before. Accordingly, a process in block 38 may be implemented by the first algorithm to identify those similar errors as possible solutions.

In embodiments, in step 30, solutions determined in block 38 by the first algorithm may be implemented. When multiple possible solutions were determined in block 38 by the first algorithm, then the second algorithm may successively implement each of the identified solutions until the error is corrected.

In embodiments illustrated in FIGS. 4 and 5, an error in a communication network may be any kind of error. Although in some embodiments, an error may be a handover error, in other embodiments, an error may be any other kind of error which is the source of any kind of communication failure, network inefficiency, and/or other issues appreciated by those skilled in the art.

Example FIG. 6 illustrates a process using algorithms to correct handover errors in a communication network, in accordance with embodiments. Some embodiments are particular to handover errors. In a process, at step 42, a handover error may be detected in a communication network. After a handover error is detected, in step 44, at least one possible solution to the handover error may be determined using a first algorithm. For example, in embodiments, as shown in block 48, the first algorithm may identify one or more possible solutions to the handover error based on handover errors that have occurred in communication networks in the past. After one or more possible solutions to the detected handover error have been determined, in step 46, the determined one or more possible solutions are implemented by a second algorithm in an attempt to correct the detected error. For example, in embodiments, as shown in block 50, the second algorithm may attempt to successively implement each of the identified one or more solutions until the handover error is corrected.

Example FIGS. 7A and 7B illustrate a process of updating an artificial intelligence engine with feedback from human resources, in accordance with embodiments. In some embodiments, artificial intelligence may be implemented to correct communication network errors. For example, in embodiments illustrated in FIG. 10, 11, and/or 12, an artificial intelligence engine 76 may correct communication network errors. In embodiments, artificial intelligence may be any kind of machine or computer operation that mimics cognitive functions that humans associated with the human mind, such as learning and/or problem solving. In embodiments, artificial intelligence may be an algorithm and/or collection of algorithms that are configured to solve problems and/or learn solutions through empirical analysis, computation deduction, and/or other methodologies appreciated by those skilled in the art. Non-limiting examples of different types of artificial intelligence algorithms are machine learning algorithms, deep learning algorithms, neural network algorithms, big data analysis algorithms, and/or other types of algorithms appreciated by those skilled in the art.

In embodiments, the example process illustrated in FIGS. 7A and/or 7B is continuously running, intermittently running, responsively running, proactively running, periodically running, and/or be implemented in any manner appreciated by those skilled in the art.

In embodiments illustrated in FIGS. 7A and 7B, after the process starts, in step 52, errors in communication network are detected. Such errors may be detected in any number of different ways, as appreciated by those skilled in the art.

For example, in embodiments, errors may be proactively detected by testing a network with hypothetical handovers using simulations, emulations, and/or other method appreciated by those skilled in the art. For example, in embodiments, errors may be proactively detected by comparing various database configurations across a wireless communications network.

In embodiments, errors may be responsively detected in response to communication failures, customer complaints, network efficiency analysis, and/or any other method appreciated by those skilled in the art. In embodiments, errors may be responsively detected from handover statistics using thresholds below acceptable ranges to detect handover relationship problems.

In embodiments, errors may be passively detected. For example, in embodiments, network attributes can be routinely analyzed in high traffic areas either randomly, based on predefined triggers, based on dynamic triggers, based on triggers determined by artificial intelligence, and/or any other passive detection method appreciated by those skilled in the art. As another example, errors may occur after changes in a wireless communication network and the parts of the network that have been changed may be passively checked for the purposes of early detection.

After detection of errors in step 52, step 54 determines if one or more errors has been detected, in accordance with embodiments. In embodiments, since multiple errors may have the same cause, step 52 may be configured to detect a plurality of errors prior to proceeding to step 54. In embodiments, a process proceeding from step 52 to step 54 may be triggered by any number of circumstance, such as a time threshold, a process operation threshold, an error count threshold, a predetermined trigger, a dynamically determined trigger, a trigger determined by artificial intelligence, a predetermined threshold, a dynamically determined threshold, a threshold determined by artificial intelligence, and/or any other circumstance appreciated by those skilled in the art. In embodiments, the configurations of the network relation table and the X2 relations may be finite, so after all of these configurations have been checked (e.g. either proactively, reactively, and/or passively), then detection operations may cease.

If it is determined that errors have not been detected in step 54, then the process may loop back to step 52 to attempt to detect for more errors, in accordance with embodiments. In embodiments, this loop between step 52 and step 54 may be implemented indefinitely until an error is detected. In other embodiments, the loop between step 52 and step 54 may be terminated after a predetermined trigger event, dynamically determined trigger event, and/or another circumstance appreciated by those skilled in the art. In embodiments, if the loop between step 52 and step 54 is terminated, the process illustrated in FIGS. 7A and 7B may be automatically restarted and/or otherwise restarted in a manner appreciated by those skilled in the art.

If it is determined that one or more errors are detected in step 54, then the process continues to step 56. In step 56, one or more possible solutions may be determined for the one or more errors detected in step 54, in accordance with embodiments. In embodiments, the one or more possible solutions may be determined by a first algorithm and/or first plurality of algorithms that does not require control by a human resource. In embodiments, the first algorithm is an artificial intelligence algorithm and/or any other kind of algorithm appreciated by those skilled in the art. In embodiments, since a specific error detected in step 52 may not have occurred before in a network, determining one or more possible solutions in step 56 may include determining solutions to errors that occurred in the past that were sufficiently similar to the errors detected in step 54. In embodiments, step 56 may include detecting a threshold number of solutions which are most similar to the errors detected in step 54. The threshold number of solutions may be a predetermined number of solutions, a dynamically determined number of solutions, a number of solutions determined by artificial intelligence, a number of solutions according to the number of errors detected in step 54, and/or any other number of solutions appreciated by those skilled in the art. In embodiments, it may be preferable in step 56 to identify a plurality of possible solutions to maximize the chances of a correct solution of the plurality of solutions being identified. In embodiments, in may be preferable in step 56 to limit the number of possible solutions based on available system resources and/or other circumstances appreciated by those skilled in the art. In embodiments, the identification of possible solutions in step 56 may be updated in an artificial intelligence engine to correspond to the errors detected in step 52.

In embodiments, after step 56, the process continues to step 58. In step 58, if no possible solutions were identified in step 56, then the process continues to step 64. In step 64, in embodiments, the one or more errors detected in step 52 may be referred to a human resource for manual correction, since step 56 was unable to determine any possible solutions. Although algorithms and/or artificial intelligence may be successful in finding possible solutions to network errors, in some circumstances human intelligence, problem solving skills, education, experience, intuition, and/or other human specific attributes are able to solve problems that are not possible by algorithm, in accordance with embodiments. Although it may sometimes be necessary to refer errors detected in step 52 to human resources in step 64, human resources may be conserved, minimized, efficiently allocation, and/or otherwise maximized by first attempting to determine possible solutions in step 56, in accordance with embodiments.

In embodiments, after step 64, the process continues to step 66 where solutions to errors detected in step 52 that were manually corrected are updated to an artificial intelligence engine. In embodiments, even when no possible solutions can be determined in step 56, once a solution is made by human resources, that solution is updated into an artificial intelligence engine so that when the same or similar errors are detected in the future, solutions to those same or similar errors may be determined in step 56. In embodiments, an artificial intelligence engine and/or other kind of algorithms are updated to increase the effectiveness in automatically determining possible solutions to detected errors. This upgrading of the artificial intelligence and/or other kinds of algorithms may effectively train an artificial intelligence engine, which may (in embodiments) conserve human resources and/or otherwise make the system more effective and/or efficient as appreciated by those skilled in the art. In embodiments, after step 66, the process may return to step 52 to detect new errors.

In embodiments, in step 58, if one or more solutions to the errors detected in step 54 is determined in step 56, then the process may continue to step 60. In step 60, in embodiments, the one or more possible solutions determined in step 56 may be implemented. If more than one possible solution was determined in step 56, then each of the plurality of possible solutions may be successively implemented in step 60, in accordance with embodiments. In some embodiments, the plurality of possible solutions may be successively implemented until the error is corrected. In other embodiments, all of the plurality of possible solutions may be successively implemented and if more than one possible solution corrects the error, then the system may evaluate the differences between those two solutions. In embodiments, a system may update an artificial intelligence engine relating to the success of any solution that successfully corrects any error, which may (in embodiments) be a dynamic evolution of the artificial intelligence engine.

In step 62, it may be determined if any of the possible solutions determined in step 56 were successful in correcting the one or more errors identified in step 52, in accordance with embodiments. In step 62, if the one or more errors were not corrected in step 50, then the process continues to step 64. In embodiments, if the errors are not correct, the process may not continue from step 52 to 64 after all possible solutions have been implemented In step 64, in embodiments, the one or more errors detected in step 52 may be referred to a human resource for manual correction, since step 62 was unable to correct the errors detected in step 52. Although algorithms and/or artificial intelligence may be successful in finding possible solutions to network errors, in some circumstances, human intelligence, problem solving skills, education, experience, intuition, and/or other human specific attributes are able to solve problems that are not possible by algorithm, in accordance with embodiments. Although it may sometimes be necessary to refer errors detected in step 52 to human resources in step 64, human resources may be conserved, minimized, efficiently allocation, and/or otherwise maximized by first attempting to correct the errors in step 60, in accordance with embodiments.

In embodiments, after step 64, the process continues to step 66 where solutions to errors detected in step 52 that were manually corrected are updated to an artificial intelligence engine. In embodiments, even when determined possible solutions are unsuccessfully implemented in step 60, once a solution is made by human resources, that solution is updated into an artificial intelligence engine so that when the same or similar errors are detected in the future, solutions to those same or similar errors may be determined in step 56. In embodiments, an artificial intelligence engine and/or other kinds of algorithms are updated to increase the effectiveness in automatically determining possible solutions to detected errors. This upgrading of the artificial intelligence and/or other kinds of algorithms may effectively train an artificial intelligence engine, which may (in embodiments) conserve human resources and/or otherwise make the system more effective and/or efficient as appreciated by those skilled in the art. In embodiments, after step 66, the process may end. In embodiment, if the one or more errors detected in step 62 are corrected, then the process may end.

Embodiments illustrated in example FIG. 7B are similar to the embodiments illustrated in FIG. 7A. However, in the embodiments illustrated in example FIG. 7B, the process may continue indefinitely after it is started, under normal operation. For example, a process illustrated in the embodiments illustrated in FIG. 7B may continuously detect and correct errors proactively. In embodiments, the process illustrated in FIG. 7B may be implemented in parallel in a plurality of instances to increase and/or maximize the capacity of error correction.

Embodiments illustrated in example FIG. 7C may limit the number of number of possible solutions in step 5, in accordance with embodiments. For example, when the embodiments illustrated in FIGS. 7A and 7B are implemented, there may be a large number of possible solutions determined in step 56. Depending on the circumstances, it may be impractical and/or otherwise prohibitive to attempt to implement all of those solutions prior to referring the problem to human resource manual correction in step 64. Accordingly, if the one or more errors is determined not to be corrected in step 62, then the process may proceed to step 63, in accordance with embodiments. In step 63, it may be determined if the number of possible solution attempts (e.g. n number of solution implementation attempts) exceeds a threshold number of solution attempts (e.g. N number of solution implementation attempts threshold). If the n number of possible solution attempts is below the threshold N, then the process may proceed back to step 56 to determined another possible solution, in accordance with embodiments. If the n number of possible solution attempts is not less than the threshold N, then the process may proceed to step 64 for human resource manual correction 64, in accordance with embodiments. Threshold N may be a predetermined threshold and/or a dynamical determined threshold, in accordance with embodiments. For example, in embodiments, N may be equal to 2 or any other predetermined number.

Example FIG. 8 illustrates a processing unit, in accordance with embodiments. Although embodiments relate to a method, embodiments may also relate to an apparatus. Those skilled in the art appreciate that such an apparatus may take any kind of form, including a computing device, a server, a cloud computing service, a virtual machine, and/or any other apparatus that may implement any of the processes discussed above. In example non-limiting embodiments, the apparatus may be a processing unit 68, which may be any kind of hardware and/or collection or hardware that implements any of the processes discussed above. In embodiments, the processing unit 68, may include a detection unit 70, a determining unit 72, and/or an implementation unit 74. For example, detection unit 70 may perform some or all of the processes discussed above for step 52 and step 54, in accordance with embodiments. For example, determining unit 72 may perform some or all of the processes discussed above for step 56 and step 58, in accordance with embodiments. For example, implementation unit 74 may perform some or all of the processes discussed above for step 60 and step 62.

Example FIG. 9 illustrates a relationship between a processing unit and an artificial intelligence engine, in accordance with embodiments. In embodiments, processing unit 68 interfaces with artificial intelligence engine 76. Artificial intelligence engine 76 may take any form as appreciated by those skilled in the art. For example, in embodiments, detection unit 70 may utilize artificial intelligence from artificial intelligence engine 76 to detect errors in a communication network. For example, in embodiments, determining unit 72 may utilize artificial intelligence from artificial intelligence engine 76 to determine one or more possible solutions to errors detected by detection unit 70. For example, in embodiments, implementation unit 74 may utilize artificial intelligence from artificial intelligence engine 75 to implement solutions determined by detection unit 72 for errors detected by detection unit 70.

Example FIG. 10 illustrates multiple algorithms included in an artificial intelligence engine, in accordance with embodiments. In embodiments, artificial intelligence engine 76 may include one or more algorithms (e.g. algorithm #1, algorithm #2, algorithm #N, etc.). Different algorithms of artificial intelligence engine 76 may be interoperable with each other, independent from each other, a mix of interdependence, and/or any other configuration appreciated by those skilled in the art. Algorithms of artificial intelligence engine 76 may be static algorithms, dynamically evolving algorithms, algorithms designed by human resources, algorithms created by artificial intelligence, and/or originating from any source appreciated by those skilled in the art. In embodiments, there is no limit to the number of algorithms, the resources available to the algorithms, physical location of the algorithms, processing of the algorithms, and/or any other features of the algorithms as appreciated by those skilled in the art.

Example FIG. 11 illustrates different types of artificial intelligence algorithms that may be included in an artificial intelligence engine, in accordance with embodiments. Artificial intelligence engine 76 may include many different kinds of algorithms for the purposes of embodiments. For example, artificial intelligence engine 76 may implement artificial intelligence algorithms 84, in accordance with embodiments. For example, artificial intelligence engine 76 may implement machine learning algorithms 86, in accordance with embodiments. For example, artificial intelligence engine 76 may implement deep learning algorithms 88, in accordance with embodiments. For example, artificial intelligence engine 76 may implement neural network algorithms 90, in accordance with embodiments. For example, artificial intelligence engine 76 may implement big data analysis algorithms 92, in accordance with embodiments. For example, artificial intelligence engine 76 may implement a reverse engineering algorithm and/or philosophy, in accordance with embodiments. In embodiments, any kind of algorithm may be implemented by artificial intelligence engine 76 that is appreciated by those skilled in the art.

Example FIG. 12 illustrates an artificial intelligence engine 76 interfacing with a plurality of databases, in accordance with embodiments. In embodiments, artificial intelligence engine 76 may utilize algorithms that depend on raw data, processed data, and/or any other kind of data appreciated by those skill in the art that is stored in database #1 92, database #2 94, database #N 96, and/or any other databases in any form appreciated by those skilled in the art. For example, determination unit 70 of processing unit 68 may use artificial intelligence engine 76 to access a data of error detection circumstances or protocols which are stored in one or more databases. For example, determining unit 72 of processing unit 68 may use artificial intelligence engine 76 to access data of possible solutions which are stored in one or more databases. For example, implementation unit 74 of processing unit 68 may use artificial intelligence engine 76 to implement determined solutions which are stored in one or more databases.

Example FIG. 13 illustrates the different types of databases with which an artificial intelligence engine may interface, in accordance with embodiments. As appreciated by those skilled in the art, the number, types, configurations, implementation, and/or any other attributes of databases in artificial intelligence is unlimited. Examples of databases, illustrated in FIG. 13 include base stations database 98, communication network cells database 100, network relation table relations database 102, network relation table issues database 104, handover relation issues database 106, X2 relation issues database 108, and/or any other kind of database appreciated by those skilled in the art.

Example FIG. 14 illustrates a schematic of an example of a cloud computing node, in accordance with embodiments. Cloud computing node 1200 is only one example of a suitable cloud computing node and is not intended to suggest any limitation as to the scope of use or functionality of embodiments of the invention described herein. Regardless, cloud computing node 1200 is capable of being implemented and/or performing any of the functionality set forth hereinabove. The term processing node is a logical concept. Any number of central processing units with any number of cores or machines can be in a single processing node.

In cloud computing node 1200 there is a computer system/server 1202, which is operational with numerous other general purpose or special purpose computing system environments or configurations. Examples of well-known computing systems, environments, and/or configurations that may be suitable for use with computer system/server 1202 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1202 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 1202 in cloud computing node 1200 is shown in the form of a general-purpose computing device. The components of computer system/server 1202 may include, but are not limited to, one or more processors or processing units 1204, a system memory 1206, and a bus 1208 that couples various system components including system memory 1206 to processor 1204.

Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1002, and it includes both volatile and non-volatile media, removable and non-removable media.

The system memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1214 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of various embodiments of the invention.

Program/utility 1216, having a set (at least one) of program modules 1218, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. Program modules 1218 generally carry out the functions and/or methodologies of various embodiments of the invention as described herein.

Computer system/server 1202 may also communicate with one or more external devices 1020 such as a keyboard, a pointing device, a display 1222, etc.; one or more devices that enable a user to interact with computer system/server 1202; and/or any devices (e.g., network card, modem, etc.) that enable computer system/server 1202 to communicate with one or more other computing devices. Such communication can occur via I/O interfaces 1224. Still yet, computer system/server 1202 can communicate with one or more networks such as a local area network (LAN), a general wide area network (WAN), and/or a public network (e.g., the Internet) via network adapter 1226. As depicted, network adapter 1226 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

Example FIG. 15 illustrates cloud computing environment 1302, in accordance with embodiments. As shown, cloud computing environment 1302 comprises one or more cloud computing nodes 1200 with which local computing devices used by cloud consumers, such as, for example, personal digital assistant (PDA) or cellular telephone 1304, desktop computer 1306, laptop computer 1308, and/or automobile computer system 1310 may communicate. Nodes 1200 may communicate with one another. They may be grouped (not shown) physically or virtually, in one or more networks, such as Private, Community, Public, or Hybrid clouds as described hereinabove, or a combination thereof. This allows cloud computing environment 1302 to offer infrastructure, platforms and/or software as services for which a cloud consumer does not need to maintain resources on a local computing device. It is understood that the types of computing devices 1304, 1306, 1308, 1310 shown in FIG. 15 are intended to be illustrative only and that computing nodes 1200 and cloud computing environment 1302 can communicate with any type of computerized device over any type of network and/or network addressable connection (e.g., using a web browser).

Example FIG. 16 illustrates a set of functional abstraction layers provided by cloud computing environment 1302 (FIG. 15), in accordance with embodiments. It should be understood in advance that the components, layers, and functions shown in FIG. 16 are intended to be illustrative only and embodiments are not limited thereto. As depicted, the following layers and corresponding functions are provided:

Hardware and software layer 1402 includes hardware and software components. Examples of hardware components include mainframes; RISC (Reduced Instruction Set Computer) architecture based servers; storage devices; networks and networking components. Examples of software components include network application server software and database software.

Virtualization layer 1404 provides an abstraction layer from which the following examples of virtual entities may be provided: virtual servers; virtual storage; virtual networks, including virtual private networks; virtual applications and operating systems; and virtual clients. In one example, management layer 1406 may provide the functions of processing unit 68. Workloads layer 1408 provides examples of functionality for which the cloud computing environment may be utilized.

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be obvious and apparent to those skilled in the art that various modifications and variations can be made in the embodiments disclosed. This, it is intended that the disclosed embodiments cover the obvious and apparent modifications and variations, provided that they are within the scope of the appended claims and their equivalents.

What is claimed is:
1. A method comprising:
proactively detecting at least one handover error in a communication link between base stations in a wireless communication network;

determining, using an artificial intelligence engine, a plurality of possible solutions to the at least one handover error, based on a similarity to handover errors in wireless communication networks that have occurred in the past, wherein the plurality of possible solutions comprises a first possible solution and a second possible solution;

implementing the first possible solution to correct the at least one handover error; and when the implementing of the first possible solution fails to correct the at least one handover error, implementing the second possible solution to correct the at least one handover error.

2. The method of claim 1, further comprising:

updating the artificial intelligence engine based on results of the implementing of the first possible solution and the implementing of the second possible solution.

3. The method of claim 1, wherein the artificial intelligence engine implements at least one of:

an artificial intelligence algorithm;
a machine learning algorithm;
a deep learning algorithm;
a neural network algorithm; and
a big data analysis algorithm.

4. The method of claim 1, wherein the determining of the plurality of possible solutions comprises:

utilizing, by the artificial intelligence engine, at least one database comprising a plurality of solutions.

5. The method of claim 4, wherein the plurality of solutions comprises solutions to the handover errors in the wireless communication networks that have occurred in the past.

6. The method of claim 4, wherein the at least one database comprises at least one of:

a database of base stations in the wireless communication network;
a database of cells in the wireless communication network;
a database of network relation table relations in the wireless communication network;
a database of network relation table issues in the wireless communication network;
a database of handover relation issues in the wireless communication network; and
a database of X2 relation issues relations in the wireless communication network.

7. The method of claim 5, further comprising:

successively implementing each possible solution of the plurality of possible solutions until the at least one handover error is corrected.

8. The method of claim 1, wherein the at least one handover error is a failure to handover the communication link between user equipment from a first communication node to a second communication node.

9. The method of claim 8, wherein:

the wireless communication network is at least one of an LTE network, a 4G network, and a 5G network;
at least one of the first communication node and the second communication node is at least one of an LTE base station, a 4G base station, and a 5G base station; and
the at least one handover error is an X2 interface error.

10. The method of claim 8, wherein at least one of:

the first communication node and the second communication node are a same type of communication node; and
the first communication node and the second communication node are different types of communication nodes.

11. The method of claim 10, wherein at least one of:

the same type of communication node are from a same manufacturer;
the same type of communication node are from different manufacturers;
the same type of communication node are at least one of two macro cells, two small cells, two outdoor cells, two indoor cells, two femto cells, and two micro cells;
the same type of communication node are on different local networks;
the same type of communication node are on a same local network;
the different types of communication nodes are from different manufacturers;
the different types of communication nodes are from a same manufacturer;
the different types of communication nodes are at least one of a macro cell, a small cell, an outdoor cell, an indoor cell, a femto cell, and a micro cell;
the different types of communication nodes are on a same network; and
the different types of communication nodes are on different local networks.

12. The method of claim 1, wherein the at least one handover error is at least one of:

an X2 interface error;
a one-way communication error;
an incomplete connection error; and
an S1 handover communication error.

13. The method of claim 1, wherein the at least one handover error is a neighbor relation table error.

14. The method of claim 13, wherein the neighbor relation table error comprises at least one of:

missing values;
incomplete definitions;
one-way communication configurations; and
one-way X2 relations.

15. The method of claim 1, further comprising:

referring the at least one handover error to a human resource when the artificial intelligence engine is unable to determine the plurality of possible solutions, causing the human resource to determine at least one possible solution.

16. The method of claim 15, further comprising:

updating the artificial intelligence engine based on the at least one possible solution determined by the human resource.

17. The method of claim 1, further comprising:

referring the at least one handover error to a human resource when the implementing of the second possible solution fails to correct the at least one handover error, causing the human resource to determine at least one possible solution.

18. The method of claim 17, further comprising:

updating the artificial intelligence engine based on the at least one possible solution determined by the human resource.

19. The method of claim 1, wherein the method is performed in a cloud computing system.

20. A computer program product, comprising a computer readable hardware storage device having computer readable program code stored therein, the computer readable program code containing instructions executable by one or more processors of a computer system to implement a method, the method comprising:

proactively detecting at least one handover error in a communication link between base stations in a wireless communication network;

determining, using an artificial intelligence engine, a plurality of possible solutions to the at least one handover error, based on a similarity to handover errors in wireless communication networks that have occurred in the past, wherein the plurality of possible solutions comprises a first possible solution and a second possible solution;

implementing the first possible solution to correct the at least one handover error; and when the implementing of the first possible solution fails to correct the at least one handover error, implementing the second possible solution to correct the at least one handover error.

* * * * *